United States Patent
Clemen, Jr. et al.

(10) Patent No.: US 10,141,711 B2
(45) Date of Patent: Nov. 27, 2018

(54) PLASMA CONFINEMENT OF A LASER GAIN MEDIA FOR GAIN-AMPLIFIED LASERS

(71) Applicant: The Boeing Company, Chicago, IL (US)

(72) Inventors: Mark Joseph Clemen, Jr., Port Orchard, WA (US); James A. Grossnickle, Bellevue, WA (US); Dejan Nikic, Seattle, WA (US)

(73) Assignee: The Boeing Company, Chicago, IL (US)

( * ) Notice: Subject to any disclaimer, the term of this patent is extended or adjusted under 35 U.S.C. 154(b) by 418 days.

(21) Appl. No.: 15/092,909

(22) Filed: Apr. 7, 2016

(65) Prior Publication Data

US 2018/0254593 A1    Sep. 6, 2018

(51) Int. Cl.

| H01S 3/091 | (2006.01) |
|---|---|
| H01S 3/0951 | (2006.01) |
| H01S 3/094 | (2006.01) |
| H01S 3/095 | (2006.01) |
| H01S 3/032 | (2006.01) |
| H01S 3/225 | (2006.01) |

(52) U.S. Cl.
CPC ............ *H01S 3/0951* (2013.01); *H01S 3/032* (2013.01); *H01S 3/0326* (2013.01); *H01S 3/094* (2013.01); *H01S 3/095* (2013.01); *H01S 3/225* (2013.01)

(58) Field of Classification Search
CPC ........ H01S 3/0951; H01S 3/094; H01S 3/095; H01S 3/225; H01S 3/0326; H01S 3/032
See application file for complete search history.

(56) References Cited

U.S. PATENT DOCUMENTS

| 5,682,399 A * | 10/1997 | Nishida ................. H01S 3/0326 372/37 |
| 6,795,462 B1 * | 9/2004 | Christiansen ......... H01S 3/0326 372/37 |
| 7,679,025 B1 | 3/2010 | Krishnan et al. |
| 2003/0006383 A1 * | 1/2003 | Melnychuk ............ B82Y 10/00 250/504 R |
| 2009/0303579 A1 * | 12/2009 | Winterberg ............... H01S 3/00 359/345 |

FOREIGN PATENT DOCUMENTS

| JP | S60124342 A | 7/1985 |
| JP | S61292842 A | 12/1986 |

OTHER PUBLICATIONS

E. Ebert et al; XUV-Amplification in an argon z-pinch plasma; Elsevier Science B. V.; 1998.
European Search Report; EP17164803; Sep. 8, 2017.
(Continued)

*Primary Examiner* — Kinam Park
(74) *Attorney, Agent, or Firm* — Duft & Bornsen, PC (57) ABSTRACT

Laser amplification utilizing plasma confinement of a gas laser gain media is described. The gas laser gain media is compressed into plasma utilizing a self-reinforcing magnetic field referred to a plasma pinch (e.g., a flow stabilized z-pinch). In the pinch, the gas laser gain media is compressed to a high density, which improves the gain of the media. Coherent light is transmitted through the plasma pinch, which is amplified by the plasma pinch.

28 Claims, 8 Drawing Sheets

(56) References Cited

OTHER PUBLICATIONS

F. Douglas Witherspoon; A contoured gap coaxial plasma gun with injected plasma armature; Review of Scientific Instruments 80 083506; 2009.
H. Ito et al; Angular Distribution Measurements of Energy Spectra of Protons Emitted From Hydrogen Plasma Focus; University of Toyama, Japan; 2014.
S. R. Mohanty et al; Miniature hybrid plasma focus extreme ultraviolet source driven by 10 kA fast current pulse; Review of Scientific Instruments 77 043506; 2006.
Yuanli Cheng et all; Observation of Soft X-ray Amplification In Ne-Like Ar by a Capillary Discharge; 2005.

* cited by examiner

PLASMA CONFINEMENT OF A LASER GAIN MEDIA FOR GAIN-AMPLIFIED LASERS

FIELD

This disclosure relates to the field of lasers and in particular, to providing high density gain mediums for lasers utilizing plasma confinement.

BACKGROUND

A laser is a device that emits light through a process of optical amplification using stimulated emissions of electromagnetic radiation. The term "laser" is an acronym based on this process, and refers to "light amplification by stimulated emission of radiation". The first lasers were built in the 1960's. Lasers differ from other sources of light in that they emit coherent light. Coherent light is a beam of photons that have the same wavelength and phase.

Lasers utilize what is referred to as a laser gain media to amplify light. A laser gain media adds optical energy to the light that traverses through the media through a process called pumping. Pumping may utilize electrical currents (referred to as electrical pumping) or light inputs (referred to as optical pumping) to generate photons. In either case, the laser gain media is pumped to an excited state, which then transitions to a rest state and emits photons. It is the state transitions that provide the amplification or gain capabilities to the laser gain media.

The amount of optical power that a laser produces may be limited by a number of factors that depend on the type of laser gain media in use. For crystal lasers, the amount of power may be limited by the heat density of the crystal. For gas lasers, the amount of power may be limited by the low energy density of the excited state of the gas.

It is desirable for certain applications that lasers operate at a high power, which can be difficult to achieve given the constraints of heat density limitations and/or energy density limitations for crystal lasers and gas lasers, respectively. Thus there is a desire to further improve the power output of lasers given these constraints.

SUMMARY

Embodiments described herein provide high power laser outputs utilizing plasma confinement of a gas laser gain media. The gas laser gain media is compressed into a compact plasma utilizing a self-reinforcing magnetic field referred to a plasma pinch or z-pinch. In the pinch area, the gas laser gain media is compressed to a high density, which improves the gain of the media. Coherent light is transmitted through the plasma pinch, which is amplified by the plasma pinch.

One embodiment comprises an apparatus that includes a plasma confinement device and a laser. The plasma confinement device generates a plasma pinch of at least one gas comprising a laser gain media. The laser transmits coherent light through the plasma pinch to amplify the coherent light utilizing the laser gain media compressed within the plasma pinch.

Another embodiment comprises a method of amplifying coherent light utilizing a plasma pinch. The method comprises generating a plasma pinch of at least one gas comprising a laser gain media. The method further comprises transmitting coherent light through the plasma pinch to amplify the coherent light utilizing the laser gain media compressed within the plasma pinch.

Another embodiment comprises an apparatus that includes an outer electrode in the form of a hollow cylinder that has an end with an opening. The apparatus further includes an inner electrode in the form of a hollow cylinder that is centered with an interior of the outer electrode. The apparatus further includes at least one gas supply that provides a laser gain media to the interior, and a power source. The power source is electrically coupled to the outer electrode and the inner electrode and generates an electric arc between the outer electrode and the inner electrode. The electric arc travels along an interior surface of the outer electrode towards the opening to form a plasma pinch between the inner electrode and the opening. The apparatus further includes a laser that transmits coherent light through the plasma pinch to amplify the coherent light utilizing the laser gain media compressed within the plasma pinch.

The above summary provides a basic understanding of some aspects of the specification. This summary is not an extensive overview of the specification. It is intended to neither identify key or critical elements of the specification nor delineate any scope particular embodiments of the specification, or any scope of the claims. Its sole purpose is to present some concepts of the specification in a simplified form as a prelude to the more detailed description that is presented later.

DESCRIPTION OF THE DRAWINGS

Some embodiments are now described, by way of example only, and with reference to the accompanying drawings. The same reference number represents the same element or the same type of element on all drawings.

DESCRIPTION

The figures and the following description illustrate specific exemplary embodiments. It will thus be appreciated that those skilled in the art will be able to devise various arrangements that, although not explicitly described or shown herein, embody the principles of the embodiments and are included within the scope of the embodiments. Furthermore, any examples described herein are intended to aid in understanding the principles of the embodiments, and are to be construed as being without limitation to such specifically recited examples and conditions. As a result, the inventive concept(s) is not limited to the specific embodiments or examples described below, but by the claims and their equivalents.

Figure 1:
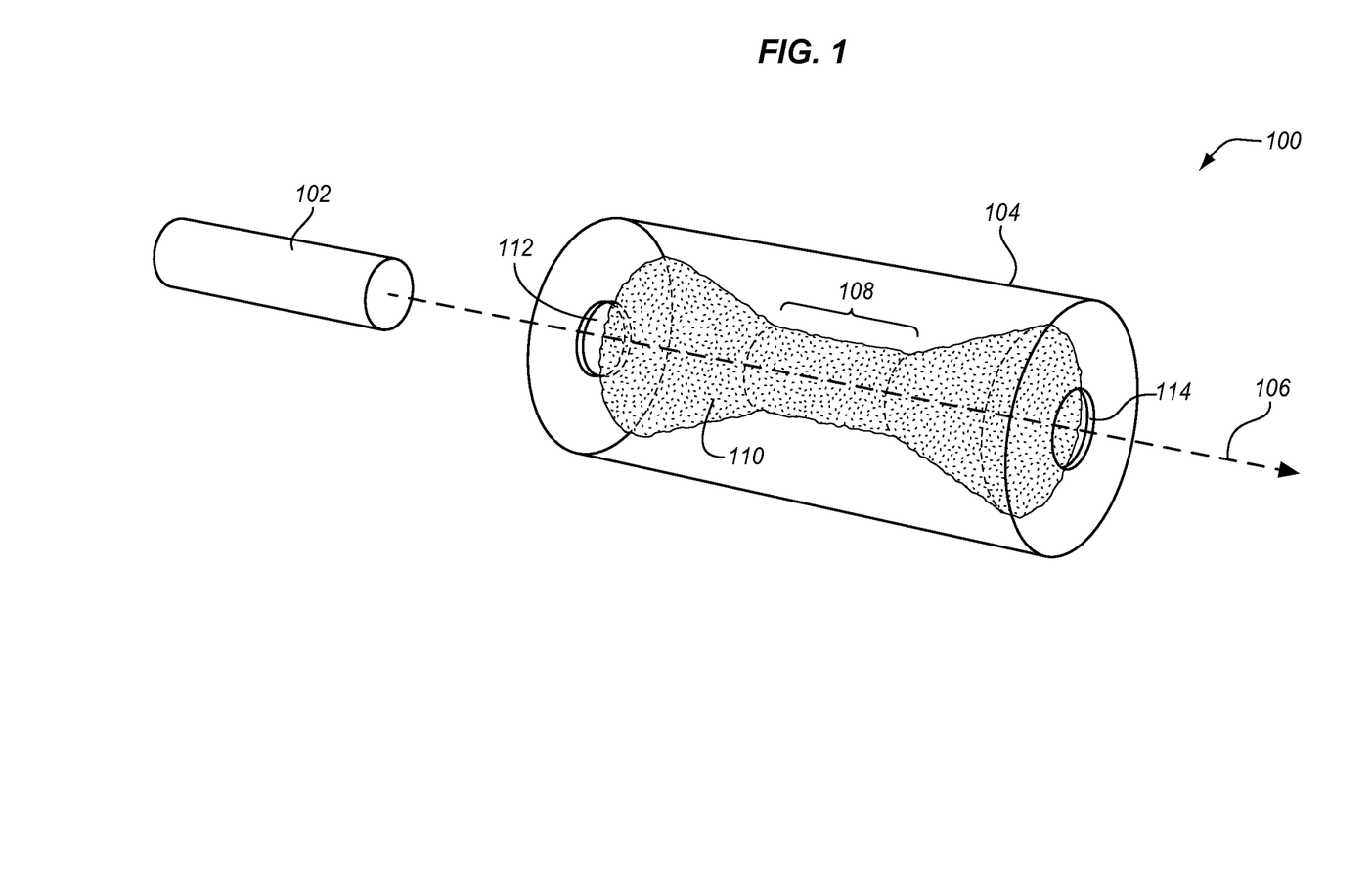
FIG. 1 illustrates a system that utilizes plasma confinement for laser gain-amplification in an exemplary embodiment.

FIG. 1 illustrates a system 100 that utilizes plasma confinement for laser gain-amplification in an exemplary embodiment. In this embodiment, system 100 includes a laser 102 and a plasma confinement device 104. Laser 102 comprises any component, system, or device that is able to output coherent light 106. Laser 102 may utilize a crystal laser gain media, a gas laser gain media, a band-gap semiconductor laser gain media, etc., as a matter of design choice. Coherent light 106 comprises photons that share a substantially similar phase and wavelength. Coherent light 106 that is output by laser 102 is amplified by a plasma pinch 108 that is generated by plasma confinement device 104. For instance, coherent light 106 output by laser 102 may enter an input 112 of plasma confinement device 104, traverse plasma pinch 108 and be amplified by plasma pinch 108, and exit an output 114 of plasma confinement device 114. In this regard, plasma confinement device 114 comprises any component, system, or device that is able to generate plasma pinch 108.

Plasma pinch 108 is a highly compressed region of a laser gain media 110, which comprises one or more gases. Some examples of laser gain media 110 include helium, neon, argon, nitrogen, iodine, and combinations thereof. In some embodiments, the gas(es) that are selected for laser gain media 110 amplify light at a wavelength that corresponds to the wavelength of coherent light 106. Laser gain media 110 may also form a high-powered excimer laser in some embodiments. Excimer lasers typically use a combination of a noble gas (e.g., argon, krypton, or xenon) and a reactive gas (e.g., fluorine or chlorine). Under electrical stimulation and high pressure, a pseudo-molecule called an excimer (or in the case of noble gas halides, an exciplex) is created. The excimer or exciplex exists in an energized state and can give rise to laser light (e.g., in the ultraviolet range).

Plasma pinch 108 may also form a sheared-flow stabilized z-pinch in some embodiments. Sheared flow stabilization can be used to stabilize what is generally an unstable z-pinch without close-fitting walls or axial magnetic fields. Sheared flow stabilization utilizes the flow of one or more gases proximate to the z-pinch, increasing the time of stability for plasma pinch 108.

Figure 2:
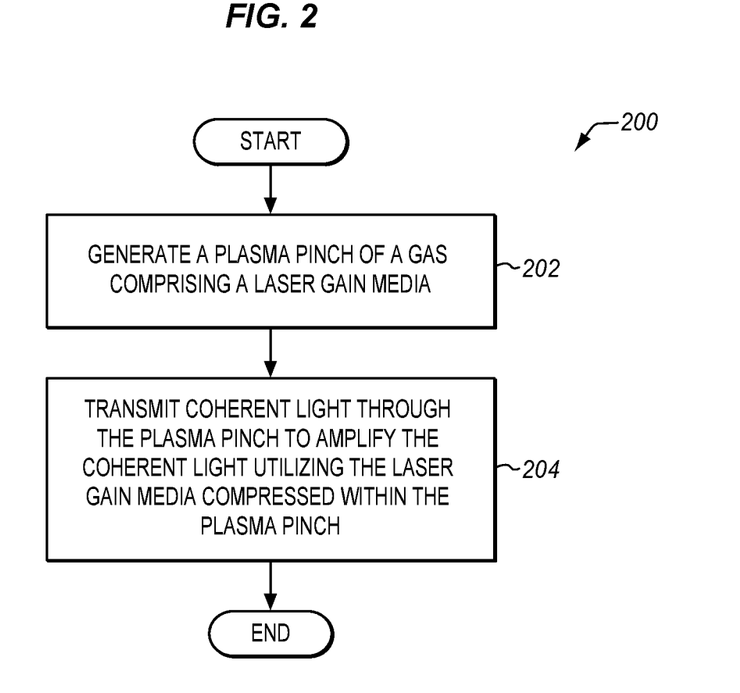
FIG. 2 is a flow chart of a method of providing laser-gain amplification utilizing a plasma pinch in an exemplary embodiment.

Consider that system 100 is ready to be placed into operation. FIG. 2 is a flow chart of a method 200 of providing laser-gain amplification utilizing a plasma pinch in an exemplary embodiment. The steps of method 200 will be discussed with respect to system 100, although method 200 may apply to other systems not shown. Method 200 may include other steps not shown, and the steps may be performed in an alternate order.

During operation of system 100, plasma confinement device 104 operates to squeeze or compress laser gain media 110 into a highly dense state to generate plasma pinch 108 (see step 202). To do so, plasma confinement device 104 may utilize magnetic fields or other mechanisms to compress laser gain media 110 into this state. For instance, plasma confinement device 104 may convert laser gain media 110 into a plasma, which is then capable of conducting an electric current. Current flowing through the plasma creates a magnetic field within plasma confinement device 104 that squeezes or compresses laser gain media 110 to form plasma pinch 108. In this form of plasma confinement, plasma pinch 108 may be self-reinforcing, with the current flowing through plasma pinch 108 generating a magnetic field, and the magnetic field in turn further compressing the plasma formed from laser gain media 110 in the region of plasma pinch 108. Generally, the density of the plasma formed from laser gain media 110 within plasma pinch 108 varies based on the current, with an increasing current through plasma pinch 108 capable of generating a magnetic field of increasing strength.

Laser 102 transmits coherent light 106 through plasma pinch 108 to amplify coherent light 106 utilizing plasma pinch 108 (see step 204). As discussed previously laser gain media 110 within the region of plasma pinch 108 is compressed to a high density. The result is that a larger number of gas atoms are available to participate in an excited state, which increases the optical gain provided by laser gain media 110. For instance, it would be expected that as the density of laser gain media 110 increases, the optical gain also increases. Therefore the optical gain available to plasma confinement device 104 may only be limited by the ability to generate highly compressed states of laser gain media 110 within plasma pinch 108.

Further, system 100 does not incur some of the drawbacks that are typically associated with high power laser systems. For instance, a crystal laser generally absorbs energy during optical pumping, which generates heat within the crystal. This limits the amount of optical pumping that can be applied to the crystal, which in turn limits the optical output power of a crystal laser. Gas lasers generally include a low pressure gas, which is electrically pumped. However, due to their low pressure, far fewer gas atoms are available to participate in the excited state, which results in a low energy density for a typical gas laser. Due to the highly compressed region of laser gain media 110 within plasma pinch 108, system 100 is capable of providing a high optical gain.

Figure 3:
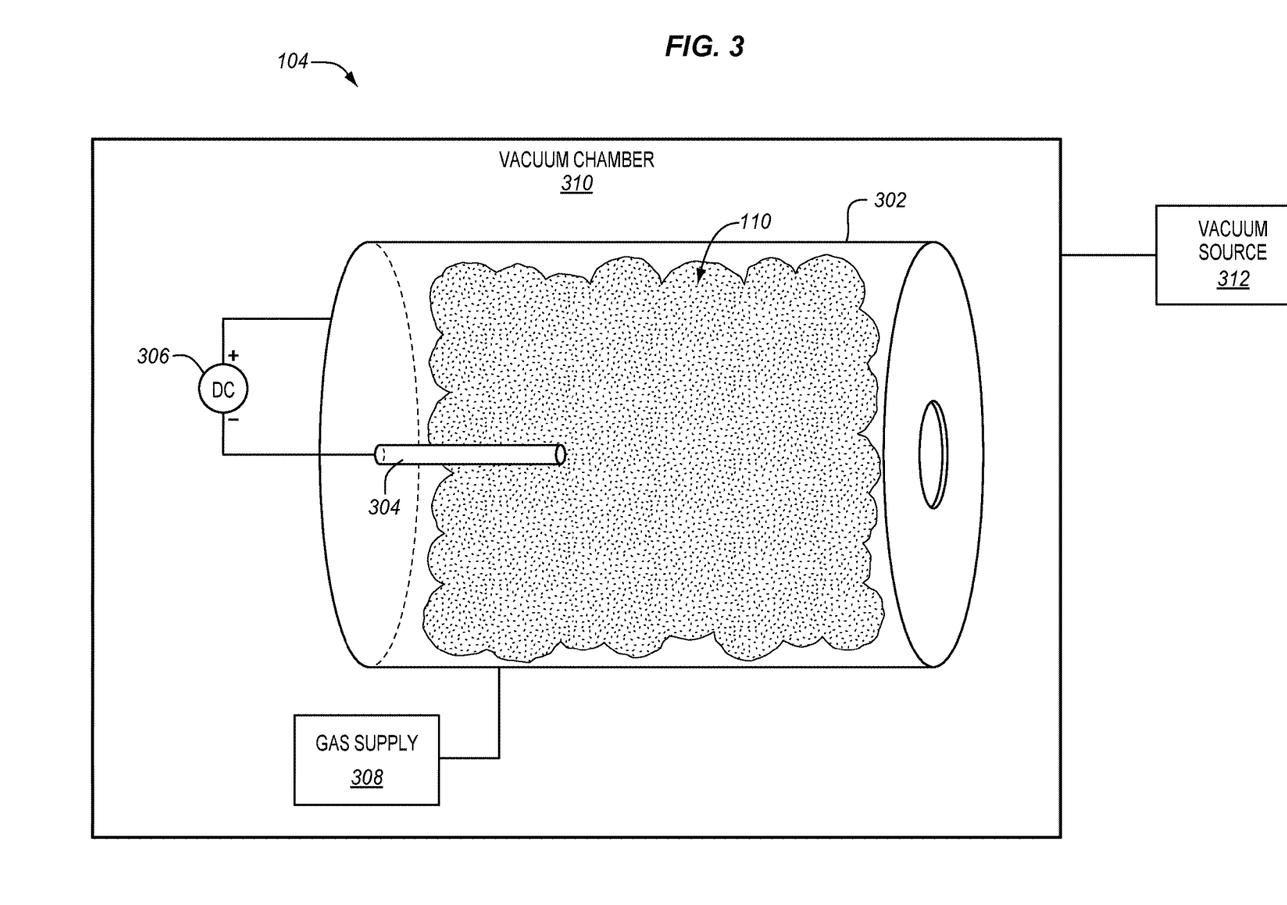
FIG. 3 illustrates additional details for the plasma confinement device of FIG. 1 in an exemplary embodiment.

FIG. 3 illustrates additional details for the plasma confinement device of FIG. 1 in an exemplary embodiment. In this embodiment, plasma confinement device 104 includes an outer electrode 302, which comprises a hollow cylinder. Plasma confinement device 104 further includes an inner electrode 304 that is within outer electrode 302, and a power source 306 that is electrically coupled to both outer electrode 302 and inner electrode 304. Power source 306 comprises any component, system, or device that is able to provide a high voltage differential across outer electrode 302 and inner electrode 304 to generate an electric arc through laser gain media 110. In some embodiments, outer electrode 302 may be surrounded by a vacuum chamber 310. A vacuum source 312 is able to draw a vacuum on vacuum chamber 310. Vacuum chamber 310 may be used to prevent the introduction of atmospheric gases into the interior of outer electrode 302. Inner electrode 304 may be located at approximately the center of outer electrode 302 in some embodiments.

FIG. 3 also illustrates a gas supply 308 that may provide laser gain media 110 to the interior of outer electrode 302 in some embodiments. In some embodiments, gas supply 308 may provide laser gain media 110 to the interior of outer electrode 302 in response to a control signal. For instance, gas supply 308 may be provided to the interior of outer electrode 302 at approximately the same time as power supply 306 generates the voltage differential.

Figure 4:
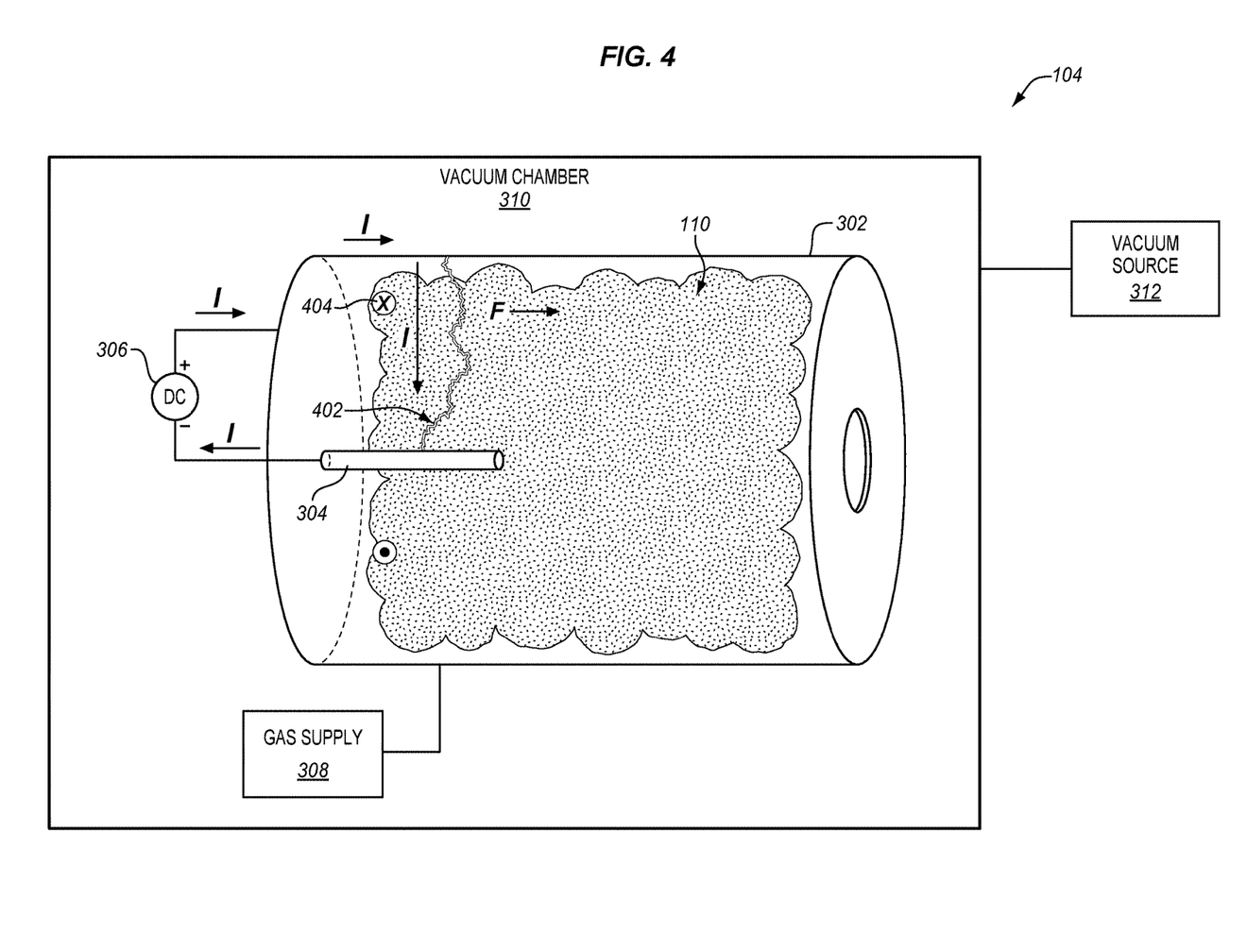
FIG. 4 illustrates an electric arc formed between an outer electrode and inner electrode for the plasma confinement device illustrated in FIG. 3 in an exemplary embodiment.
Figure 5:
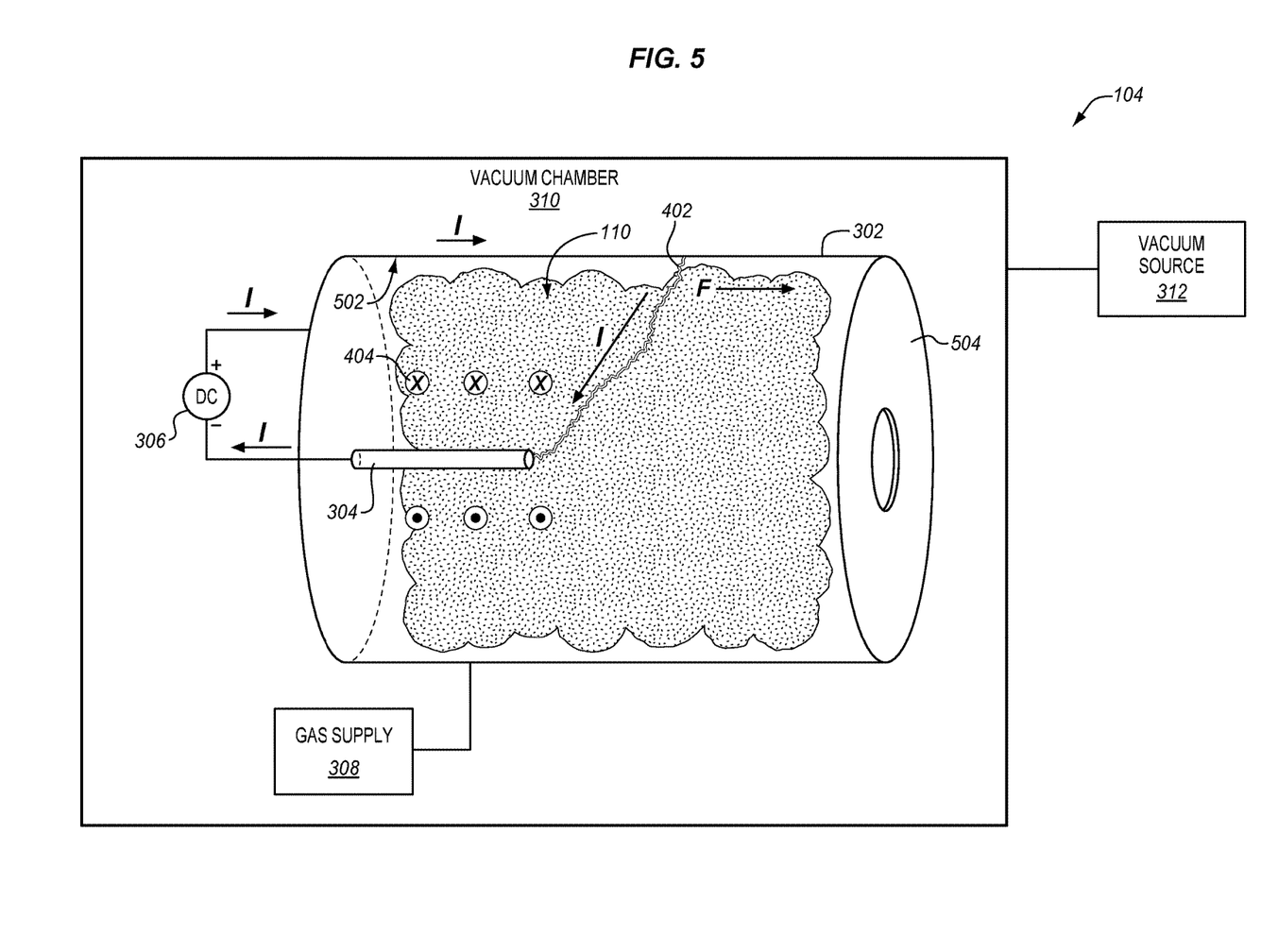
FIG. 5 illustrates the electric arc as it travels along an interior surface of the outer electrode in an exemplary embodiment.

In response to power source 306 applying a high voltage differential across outer electrode 302 and inner electrode 304, an electric arc forms through laser gain media 110. FIG. 4 illustrates an electric arc 402 formed between outer electrode 302 and inner electrode 304 in an exemplary embodiment. Electric arc 402 supports a current (I), which is supplied by power source 306. The current flowing through electric arc 402 generates a magnetic field 404. The Lorentz force (F) pushes electric arc 402 in the direction indicated by the arrow in FIG. 4. Electric arc 402 travels along an interior surface of outer electrode 302 (not shown in this view) in the direction of the force. FIG. 5 illustrates electric arc 402 as it travels along an interior surface 502 of outer electrode 302 in an exemplary embodiment. Electric arc 402 is illustrated as travelling towards an end 504 of outer electrode 302.

Figure 6:
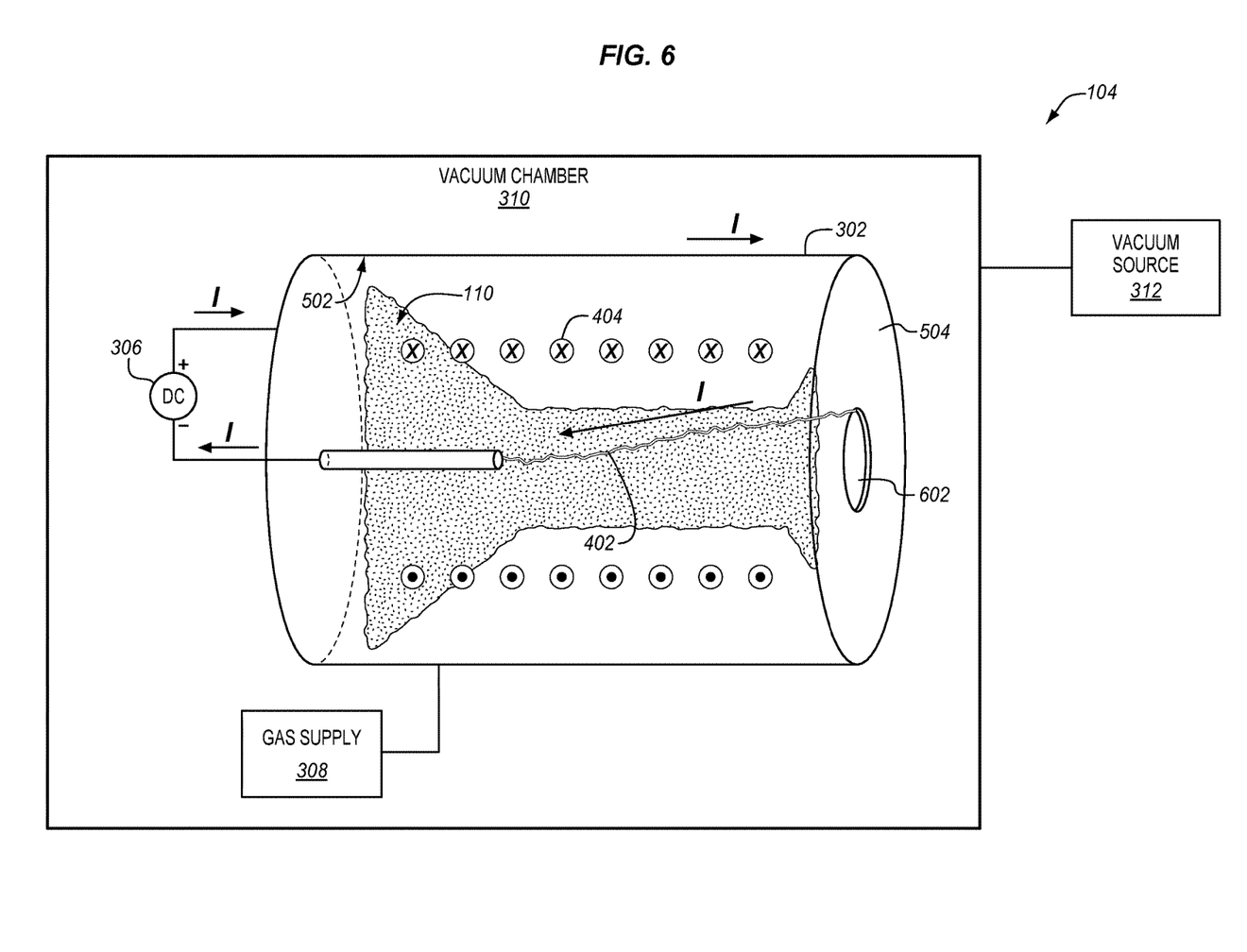
FIG. 6 illustrates an initial formation of a plasma pinch in an exemplary embodiment.

FIG. 6 illustrates an initial formation of plasma pinch 108 in an exemplary embodiment. Magnetic field 404 compresses the plasma formed from laser gain media 110 in the region between inner electrode 304 and an opening 602 in end 504 of outer electrode 302. The compressed plasma becomes very hot and very dense. As the current through plasma pinch 108 increases, the strength of magnetic field 404 increases. The compression becomes self-reinforcing.

Figure 7:
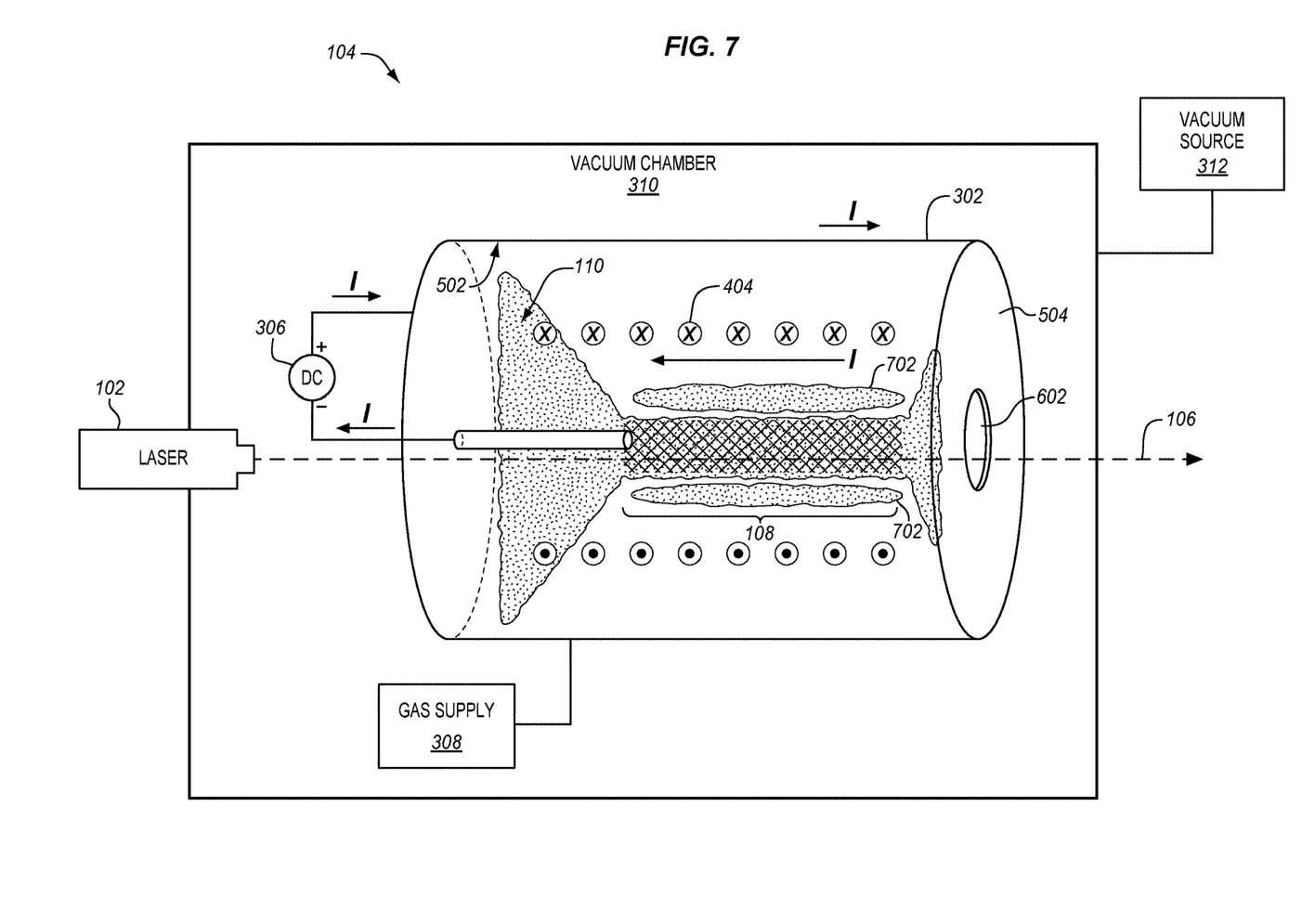
FIG. 7 illustrates the final formation of the plasma pinch in an exemplary embodiment.

FIG. 7 illustrates the final formation of plasma pinch 108 in an exemplary embodiment. Plasma pinch 108 is formed from laser gain media 110 that is highly compressed, and is capable of providing optical amplification to coherent light 106. Laser gain media 110 may comprise an ionized gas that lases itself, or may form a plasma-excimer pair. The excimer contributes a photon when excited by laser 102. In other embodiments, the highly compressed laser gain media 110 could also, by collision, compress and excite component gases towards the excitation. For example, if laser gain media 110 comprises a mixture of helium and neon, the helium is excited and transfers energy to the neon. A neutral gas 702 surrounds plasma pinch 108, providing flow stabilization to plasma pinch 108. For example, if plasma pinch 108 is a z-pinch, then the z-pinch may be stabilized using a sheared flow of neutral gas 702 that surrounds the z-pinch.

Generally, laser 102 is able to transmit coherent light 106 through plasma pinch 108 out of opening 602. For instance, laser 102 may be located proximate to inner electrode 304.

Example

Figure 8:
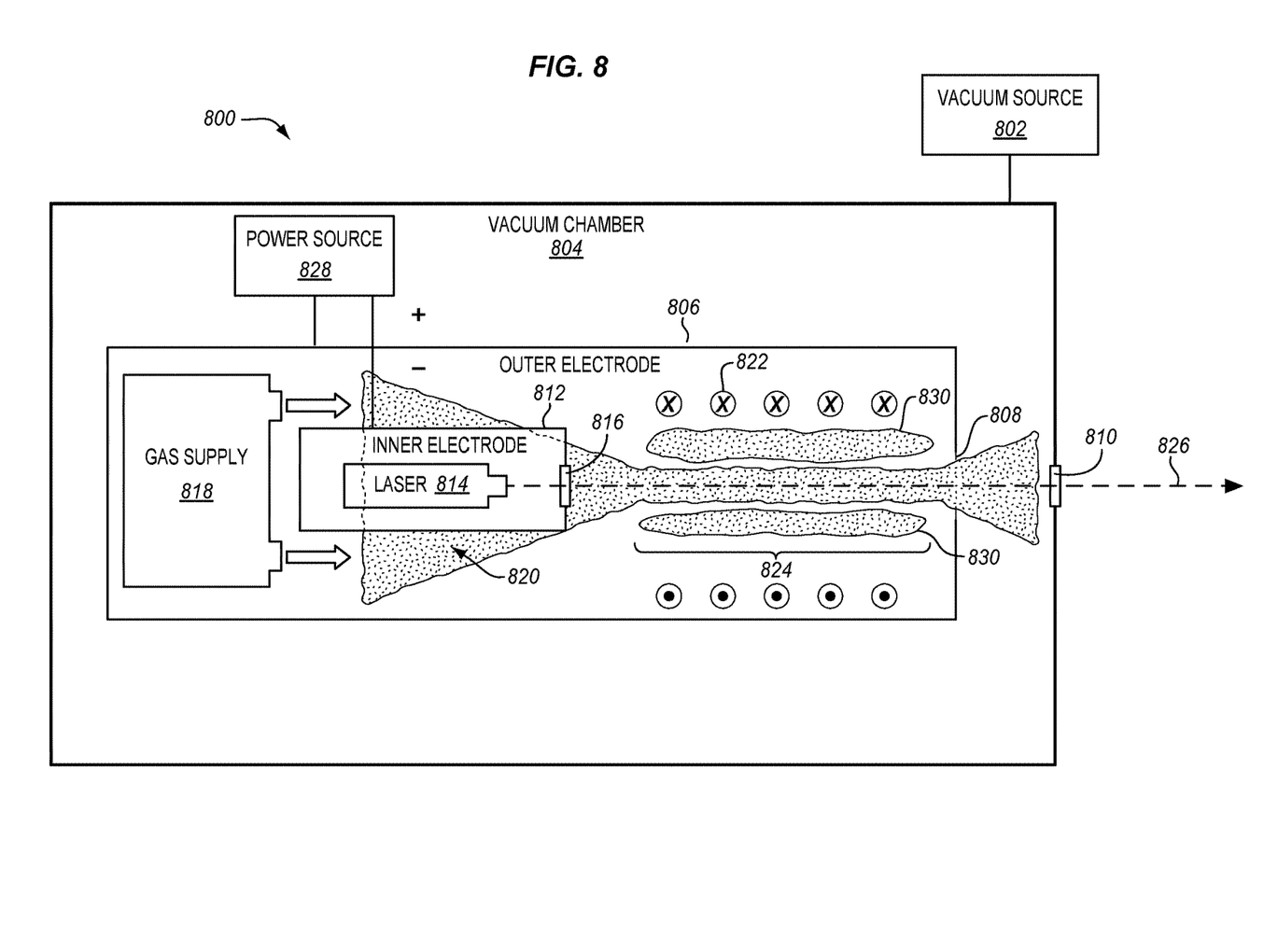
FIG. 8 is a cross-sectional view of another system that utilizes plasma confinement for laser gain-amplification in an exemplary embodiment.

FIG. 8 is a cross-sectional view of another system 800 that utilizes plasma confinement for laser gain-amplification in an exemplary embodiment. One skilled in the art will recognize that system 800 is merely one possible implementation, and other exists. Therefore, the particular example illustrated in FIG. 8 is not intended to limit the scope of the pending claims.

FIG. 8 illustrates a vacuum source 802, which is capable of drawing a vacuum on a vacuum chamber 804. Within vacuum chamber is an outer electrode 806, which includes an opening 808. In this embodiment, opening 808 is in-line with a partially reflective mirror 810 that is located in a wall of vacuum chamber 804. System 800 further includes an inner electrode 812 that is centered within outer electrode 806. A laser 814 is located within inner electrode 812, and is optically aligned with partially reflective mirror 810. Another partially reflective mirror 816 is located at the output of laser 814. A gas supply 818 is capable of providing a laser gain media 820 proximate to inner electrode 812. When a voltage differential is applied to outer electrode 806 and inner electrode 812 utilizing a power source 828, an electric arc forms (not shown), which participates in the formation of a magnetic field 822 within the center of outer electrode 806 as current flows from the opening 808 of outer electrode 806 back towards inner electrode 812. Magnetic field 822 compresses the ions of laser gain media 820, forming dense plasma within a plasma pinch 824. A neutral gas 830 surrounds plasma pinch 824, providing flow stabilization to plasma pinch 824. For example, if plasma pinch 824 is a z-pinch, then the z-pinch may be stabilized using a sheared flow of neutral gas 830 that surrounds the z-pinch.

Laser 814 generates coherent light 826, which traverses through partially reflective mirror 816, plasma pinch 824, and strikes partially reflective mirror 810. Coherent light will reflect back and forth between partially reflective mirror 810 and partially reflective mirror 816, which allows plasma pinch 824 to continue to amplify coherent light 826 until a threshold optical power is reached. Upon reaching the threshold optical power, coherent light 826 exits partially reflective mirror 810 and vacuum chamber 804. The formation of plasma pinch 824 and the optical amplification of coherent light 826 may be performed on a transient basis or a continuous basis as desired.

Any of the various elements shown in the figures or described herein may be implemented as hardware, software, firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, an element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments were described herein, the scope is not limited to those specific embodiments. Rather, the scope is defined by the following claims and any equivalents thereof.

The invention claimed is:

1. An apparatus comprising:
 a plasma confinement device configured to generate a plasma pinch of at least one gas comprising a laser gain media; and
 a laser configured to transmit coherent light through the plasma pinch to amplify the coherent light utilizing the laser gain media compressed within the plasma pinch.

2. The apparatus of claim 1 wherein the plasma confinement device comprises:
 an outer electrode in a form of a hollow cylinder;
 an inner electrode within an interior of the outer electrode; and
 a power source electrically coupled to the outer electrode and the inner electrode that is configured to generate an electric arc between the outer electrode and the inner electrode through the laser gain media;
 wherein the electric arc travels along an interior surface of the outer electrode towards an end of the outer electrode to generate the plasma pinch.

3. The apparatus of claim 2 further comprising:
a gas supply configured to provide the laser gain media to the interior.

4. The apparatus of claim 2 further comprising:
a vacuum chamber that surrounds the outer electrode; and
a vacuum source configured to generate a vacuum within the vacuum chamber.

5. The apparatus of claim 2 wherein:
the inner electrode is centered within the interior; and
the plasma pinch is generated centrally within the interior between the inner electrode and an opening through the end of the outer electrode.

6. The apparatus of claim 5 wherein:
the laser is proximate to the inner electrode and is configured to transmit the coherent light towards the opening.

7. The apparatus of claim 6 further comprising:
a first partially reflective mirror proximate to the inner electrode that is optically coupled to the laser; and
a second partially reflective mirror proximate to the opening that is configured to reflect the coherent light back through the plasma pinch to the first partially reflective mirror.

8. The apparatus of claim 1 wherein:
the plasma pinch comprises a flow stabilized z-pinch.

9. The apparatus of claim 1 wherein:
the laser gain media is selected to amplify light at a wavelength that corresponds to a wavelength of the coherent light.

10. The apparatus of claim 1 wherein:
the laser gain media is selected to form an excimer laser.

11. A method comprising:
generating a plasma pinch of at least one gas comprising a laser gain media; and
transmitting coherent light through the plasma pinch to amplify the coherent light utilizing the laser gain media compressed within the plasma pinch.

12. The method of claim 11 wherein generating the plasma pinch further comprises:
generating an electric arc through the laser gain media between an outer electrode in a form of a hollow cylinder and an inner electrode within an interior of the outer electrode, wherein the electric arc travels along an interior surface of the outer electrode towards an end of the outer electrode to generate the plasma pinch.

13. The method of claim 12 further comprising:
supplying the laser gain media to the interior of the outer electrode.

14. The method of claim 12 further comprising:
generating a vacuum within a vacuum chamber that surrounds the outer electrode.

15. The method of claim 12 wherein:
the inner electrode is centered within the interior; and
generating the plasma pinch further comprises:
generating the plasma pinch centrally within the interior between the inner electrode and an opening through the end of the outer electrode.

16. The method of claim 15 wherein transmitting the coherent light further comprises:
transmitting the coherent light towards the opening utilizing a laser.

17. The method of claim 16 further comprising:
optically coupling a first partially reflective mirror to the laser that is proximate to the inner electrode; and
reflecting the coherent light back through the plasma pinch to the first partially reflective mirror utilizing a second partially reflective mirror that is proximate to the opening.

18. The method of claim 11 wherein:
the plasma pinch comprises a flow stabilized z-pinch.

19. The method of claim 11 wherein:
the laser gain media is selected to amplify light at a wavelength that corresponds to a wavelength of the coherent light.

20. The method of claim 11 wherein:
the laser gain media is selected to form an excimer laser.

21. An apparatus comprising:
an outer electrode in the form of a hollow cylinder having an end with an opening;
an inner electrode in the form of a hollow cylinder that is centered within an interior of the outer electrode;
at least one gas supply configured to provide a laser gain media to the interior;
a power source electrically coupled to the outer electrode and the inner electrode that is configured to generate an electric arc between the outer electrode and the inner electrode, wherein the electric arc travels along an interior surface of the outer electrode towards the opening to form a plasma pinch between the inner electrode and the opening; and
a laser configured to transmit coherent light through the plasma pinch to amplify the coherent light utilizing the laser gain media compressed within the plasma pinch.

22. The apparatus of claim 21 further comprising:
a vacuum chamber that surrounds the outer electrode; and
a vacuum source configured to generate a vacuum within the vacuum chamber.

23. The apparatus of claim 21 wherein:
the laser is located within the inner electrode.

24. The apparatus of claim 23 further comprising:
a first partially reflective mirror proximate to the inner electrode that is optically coupled to the laser; and
a second partially reflective mirror proximate to the opening that is configured to reflect the coherent light back through the plasma pinch to the first partially reflective mirror.

25. The apparatus of claim 21 wherein:
the power source is configured to generate a positive voltage on the outer electrode with respect to the inner electrode.

26. The apparatus of claim 21 wherein:
the plasma pinch comprises a flow stabilized z-pinch.

27. The apparatus of claim 21 wherein:
the laser gain media is selected to amplify light at a wavelength that corresponds to a wavelength of the coherent light.

28. The apparatus of claim 21 wherein:
the laser gain media is selected to form an excimer laser.

* * * * *